June 15, 1937. R. W. AYER 2,084,122
APPARATUS FOR CONTROLLING AIRPLANE ELEVATORS
Filed April 13, 1935
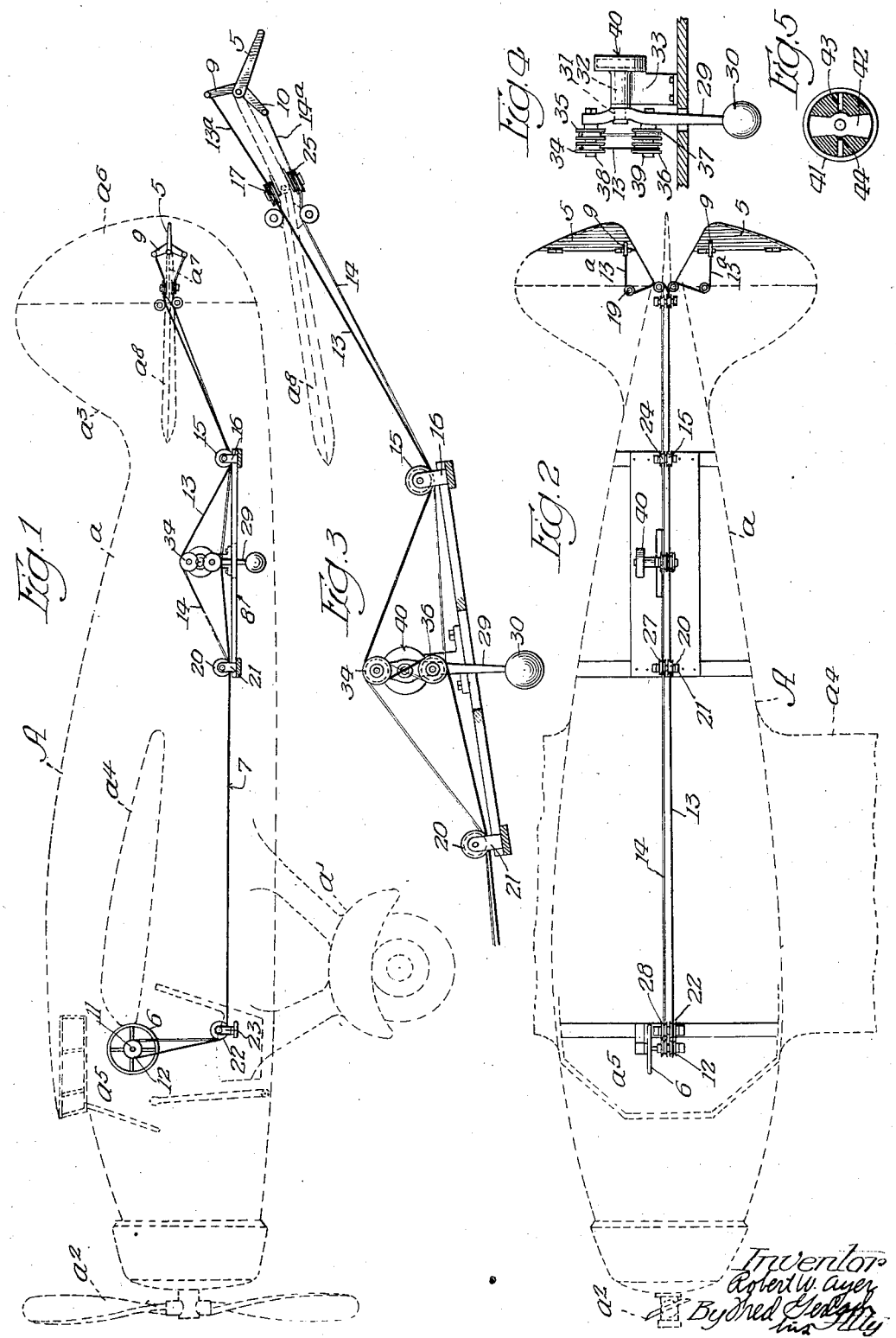

Patented June 15, 1937

2,084,122

UNITED STATES PATENT OFFICE 2,084,122

APPARATUS FOR CONTROLLING AIRPLANE ELEVATORS

Robert W. Ayer, Wayne, Mich., assignor, by mesne assignments, to Stinson Aircraft Corporation, Wayne, Mich., a corporation of Michigan Application April 13, 1935, Serial No. 16,130

3 Claims. (Cl. 244—80)

The present invention relates generally to apparatus for controlling the elevators of airplanes. More particularly the invention relates to that type of elevator controlling apparatus which is designed primarily for use in trimming the airplane with which it is associated and comprises auxiliary hinged tabs on the trailing edges of the elevators, a hand wheel in the cockpit or pilot's compartment of the airplane, and a cable system which extends longitudinally of the fuselage of the airplane and connects the tabs to the hand wheel so that the pilot by turning the wheel may tilt the tabs relatively to the elevators and cause the elevators to swing into a position wherein they extend angularly with respect to the fixed portion of the tail and trim the airplane so that it assumes a normal or regular flying position.

One object of the invention is to provide an elevator controlling apparatus of this type which serves not only as a trimming medium for the airplane with which it is associated, but also as an automatic stabilizer whereby the plane after assuming an abnormal position or attitude during flight is caused without effort or a control manipulation on the part of the pilot to return to its normal flying position. In general this apparatus comprises in addition to the tabs, hand wheel and cable system, a pendulum device which is applied to the cable system and operates substantially immediately upon downward or upward tilting of the plane to move the auxiliary tabs into such an angular position with respect to the elevators that the latter tend to return the plane to its normal flying position.

Another object of the invention is to provide for use in connection with an airplane, an automatic device which will increase the range through which the center of gravity may be moved fore and aft without making the airplane longitudinally unstable.

A further object of the invention is to provide an elevator controlling apparatus of the type and character heretofore referred to in which the pendulum device operates wholly independently of and without affecting the hand wheel.

A still further object of the invention is to provide an elevator controlling apparatus which is generally of new and improved construction and is extremely efficient in operation as well as light in weight.

Other objects of the invention and the various advantages and characteristics of the present elevator controlling apparatus will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a side view of an elevator controlling apparatus embodying the invention;

Figure 2 is a plan view;

Figure 3 is a detail view showing the manner in which the pendulum device operates when the airplane with which the apparatus is tilted to control the cable system so that the auxiliary tabs are shifted into such a position that they control the elevators so as to cause the airplane to revert back to or assume its normal flying position;

Figure 4 is a detail view of the pendulum device; and

Figure 5 is a vertical section taken on the line 5—5 of Figure 4 and showing in detail the dashpot whereby the pendulum device is controlled so that it is not likely to be moved out of its normal or vertical position with respect to the earth when the hand wheel is turned quickly by the pilot in connection with setting or adjusting the auxiliary tabs.

The invention is exemplified in connection with an airplane A of the transport type. This airplane is of conventional design and represents one form or type of airplane to which the elevator controlling apparatus forming the subject matter of the invention is adapted to be applied. As shown in the drawing, the airplane A comprises a fuselage $a$, a landing gear $a^1$, a motor driven propeller $a^2$, a tail structure $a^3$, and a pair of wings $a^4$. The fuselage $a$ embodies a cockpit or pilot's compartment $a^5$ in the front portion thereof and in this compartment is the usual pilot's seat and the stick and instruments for controlling the operation of the airplane. The wings $a^4$ are connected to and extend outwardly from the sides of the fuselage. The tail structure $a^3$ is of standard or conventional design and comprises a rudder $a^6$, and a pair of elevators $a^7$. The rudder $a^6$ is connected to a pair of foot pedals (not shown) in the pilot's compartment $a^5$ and serves, as well understood in the art, to control the direction of flight of the airplane A. The elevators $a^7$ are disposed one on one side and the other on the other side of the rudder $a^6$ and are hinged at the front edges thereof to a fixed horizontally extending tail surface or foil $a^8$. The latter forms part of the tail structure $a^3$ and serves during flight of the airplane A to sustain the rear end of the fuselage $a$. The elevators $a^7$ are suitably connected to the control stick in the pilot's compartment $a^5$ so that they swing upwards with respect to the fixed tail surface $a^8$ in response to movement of the stick in one direction and cause the airplane to ascend or climb, and swing downwards with respect to the surface $a^8$ in response to movement of the stick in the opposite direction and cause the airplane during flight to dive.

The improved controlling apparatus comprises a pair of auxiliary tabs 5, a hand wheel 6, a cable system 7, and a pendulum device 8, and operates as hereinafter described as a medium for trimming the airplane A during flight and also as an automatic stabilizer whereby the airplane is caused after assuming an abnormal flying position to revert to its normal position. The auxiliary tabs 5 are hinged to the trailing edges of the elevators $a^7$ so that they may be swung upwards or downwards into different angular positions with respect to the elevators. When the tabs are swung upwardly as hereinafter described, the air striking against the top faces thereof produces a downward moment about the hinges for the elevators and causes the elevators to swing downwardly with respect to the fixed tail surface $a^8$ into a position wherein the tail portion of the airplane is caused to move upwardly. When the auxiliary tabs 5 are swung downwardly relatively to the elevators $a^7$ the elevators are caused to swing upwards with respect to the fixed tail piece $a^8$ into a position wherein they cause the tail portion of the airplane to move in a downwards direction. As shown in the drawing, the auxiliary tabs 5 have upwardly extending horns 9 and downwardly extending horns 10. These horns are fixed in any suitable manner to the front or leading edges of the tabs and serve together with the hand wheel 6 and the cable system 7 as the medium for swinging the tabs upwardly or downwardly with respect to the elevators.

The hand wheel 6 is attached in any suitable manner to one of the side walls of the pilot's compartment $a^5$ so that it is within reach from the pilot seat. It is preferably rotatable on a horizontally extending spindle 11 and has a drum 12 at one side thereof. This drum is fixed in any suitable manner to the hub portion of the wheel so that it is rotatable with the wheel when the latter is turned in one direction or the other by the pilot of the airplane.

The cable system 7 extends between and connects the hand wheel 6 and the auxiliary tabs 5 on the trailing edges of the elevators $a^7$, and consists of a tab raising cable 13 and a tab lowering cable 14. These two cables, as shown in the drawing, extend lengthwise of the fuselage $a$ of the airplane. The rear end of the raising cable 13 passes under a vertically extending sheave 15 on a bracket 16 in the rear end of the fuselage $a$, and then extends upwardly and rearwardly to a pair of oppositely disposed, horizontally extending sheaves 17 at the center portion of the rear or trailing edge of the fixed tail surface $a^8$. At a point directly in front of the sheaves 17 the raising cable 13 is shaped or constructed to form a pair of branches 13$^a$. These branches extend around the sheaves 17 as shown in Figure 2, and then extend outwardly along the trailing edge of the fixed tail surface $a^8$ to a pair of sheaves 19 on the leading edges of the elevators $a^7$. These sheaves are located directly in front of the horns 9 and the outer ends of the branches 13$^a$ of the raising cable 13 extend around the sheaves 19 and then upward and rearwardly to the upper ends of the horns 9 where they are anchored or secured in place. The front end of the raising cable 13 extends under a vertically extending sheave 20 on a bracket 21 in the central portion of the fuselage $a$ of the airplane and passes or extends from this sheave to a vertically extending sheave 22 on a bracket 23 in the lower portion of the pilot's compartment $a^5$. From this sheave 22 the front end of the cable 13 extends upwardly to the hand wheel 6 where it is wound around and anchored in any suitable manner to the drum 12. When the hand wheel 6 is turned so as to wind the front end of the cable 13 on the drum the cable is drawn forwardly and through the medium of the forwardly extending horns 9 causes the auxiliary tabs 5 to raise with respect to the elevators $a^7$. When the tabs are in a raised position as far as the elevators are concerned, the elevators as previously pointed out are caused to swing downwardly and the tail of the plane to move upwards. The rear end of the tab lowering cable 14 extends under a vertically extending sheave 24 on the bracket 15 and then extends upwardly and rearwardly to a pair of horizontally extending, oppositely disposed sheaves 25 beneath the sheaves 17. At a point directly in front of the sheaves 25 the lowering cable 14 is provided with a pair of branches 14$^a$. These branches, as shown in the drawing, extend around the sheaves 25 and then outwardly along the trailing edge of the fixed tail surface $a^8$ to a pair of sheaves 26, directly under the sheaves 19. The outer ends of the branches 14$^a$ extend around the sheaves 26 and then downwardly and outwardly to the lower ends of the downwardly extending horns 10 where they are suitably secured or anchored in place. The front end or portion of the lowering cable 14 passes under a vertically extending sheave 27 on the bracket 21 and then passes forwardly to a vertically extending sheave 28 on the bracket 23. The extreme front end of the lowering cable 14 extends under and around the sheave 28 and then extends upwardly to the hand wheel 6 where it is wrapped around and anchored to the drum 12. When the hand wheel 6 is turned so as to wind the front end of the lowering cable 14 around the drum 12 the lowering cable is drawn forwardly and operates through the medium of the downwardly extending horns 10 to swing the auxiliary tabs 5 downwardly with respect to the elevators $a^7$. When the tabs are swung downwardly in this manner the elevators, as previously pointed out, are caused to raise with respect to the fixed tail surface $a^8$ and cause the rear or tail end of the airplane to move downwards. The front ends of the cables 13 and 14 of the cable system 7 are wound around and anchored to the drum 12 so that when the wheel is turned in one direction the cable 13 is wound onto the drum and the cable 14 is paid out, and when the wheel is turned by the pilot in the other direction the cable 14 is wound around the drum and the cable 13 is paid out. The hand wheel 6 is preferably mounted on the spindle 11 so that there is a slight frictional drag and it is not likely to be turned as the result of the pressure of the air against the tabs. When during flight it is desired to trim the airplane as the result of the center of gravity being too far forwards or too far rearwards, the pilot turns the hand wheel 6 so as properly to set the auxiliary flaps 5 relatively to the elevators $a^7$. If, for example, the load should be so distributed that the center of gravity of the airplane is too far rearwards and the plane thus has a tendency to climb, the pilot turns the hand wheel 6 so as to wind up the raising cable 13 and pay out the lowering cable 14. This manipulation or turning of the hand wheel causes the auxiliary tabs 5 to swing upwardly with respect to the elevators $a^7$ and the elevators to swing downwards and thus cause the tail to raise and offset the climbing tendency of the airplane.

The pendulum device 8 operates whenever the airplane assumes an abnormal position during flight to move the auxiliary tabs 5 into such a position that they tend to return the airplane to its original or normal flying position. It operates automatically as well as independently of the pilot of the airplane and together with the auxiliary tabs 5 and the cable system 7 serves as an automatic stabilizer for the airplane. As shown in Figure 4, the device 8 comprises a vertically extending arm 29. This arm has a ball-shaped weight 30 at its lower end and embodies a socket 31 at a point slightly beneath its extreme upper end. A shaft 32, which extends transversely of the fuselage of the airplane and is journalled in a bearing 33, has one end thereof fixed in the socket 31 and serves as a pivotal support for the arm. The bearing 33 is disposed in the rear end of the fuselage at a point midway between the brackets 16 and 21. The weight 30 operates in response to the action of gravity to maintain the arm 29 in a vertical position regardless of the extent to which the airplane may be tilted for climbing or diving purposes. In addition to the arm 29 the pendulum device 8 comprises a pair of sheaves 34 and 35, and a pair of sheaves 36 and 37. The sheaves 34 and 35 extend vertically and are mounted for free rotation on a stub shaft 38 which is connected to and carried by the extreme upper end of the arm 29 and extends parallel with the shaft 32. The sheaves 36 and 37 are mounted on a stub shaft 39 and like the sheaves 34 and 35, extend vertically. The stub shaft 39 supports the sheaves 36 and 37 for free rotation one relatively to the other and is connected to the arm 29 at a point beneath the socket 31. As shown in Figure 4 the stub shafts 38 and 39 are equidistantly positioned with respect to the shaft 32. The portion of the raising cable 13 between the sheaves 16 and 20 extends rearwardly from the sheave 20 to the sheave 36, then around the sheave 36 and upwardly to the sheave 34 and then around the sheave 34 and downwardly and rearwardly to the sheave 16. The portion of the lowering cable 14 between the sheaves 24 and 27 extends upwardly and rearwardly from the sheave 27 to the sheave 35 and thence around the sheave 35 and downwardly to the sheave 37 and finally around the sheave 37 and rearwardly to the sheave 24. By arranging the aforementioned portions of the cables 13 and 14 in this manner the rear end of the raising cable 13 is paid out and the rear end of the tab lowering cable is taken up when the arm 29 swings forward as the result of the nose of the airplane pitching downwardly. This paying out of the rear end of the tab raising cable and the taking up of the rear end of the tab lowering cable causes the auxiliary tabs 5 to swing downwards with respect to the elevators and this in turn causes the elevators to swing upwards and to bring the airplane into a level flying position. In the event that the airplane during flight should pitch upwards due to irregular air currents or for any other reason, the arm 29 of the pendulum device 8 in maintaining its vertical position with respect to the earth swings rearwardly relatively to the fuselage and causes through the medium of the sheaves on the stub shafts 38 and 39 the rear end of the tab raising cable 13 to be taken up and the rear end of the tab lowering cable 14 to be paid out. This taking up of the rear end of the tab raising cable 13 and the paying out of the rear end of the tab lowering cable 14 causes the auxiliary tabs 5 to swing upwards with respect to the elevators and this, as previously pointed out, in turn causes the elevators $a^7$ to swing downwards and to raise the tail of the airplane. Thus it may be seen that the pendulum device 8 serves automatically to stabilize the airplane. The arm 29 of the pendulum device is free to swing fore and aft with respect to the airplane and does not disturb the position of the hand wheel 6 in the pilot's compartment $a^5$. Thus, after the pilot turns the hand wheel 6 in order to set the auxiliary tabs 5 for airplane trimming purposes the pendulum device 8 functions independently of the pilot and serves automatically and without affecting the position of the hand wheel 6 to stabilize the airplane.

In order to prevent a sudden turn of the hand wheel 6 from swinging the arm 29 of the pendulum device 8 out of its normal vertical position and thus causing an undesired swinging of the auxiliary tabs 5 a dashpot 40 is provided. This dashpot is in the form of an oil filled casing 41 and a vane 42. The casing is connected to or formed integrally with the bearing 33 for the shaft 32. The end of the shaft 32 opposite the arm 29 extends into the casing 41 and the vane 42 is fixed thereto so that it is rotatable with the arm 29. Partitions 43 are disposed in the casing and form orifices 44 through which the oil in the casing must pass or flow when the vane is rotated in the casing. The oil in the casing is in the form of a cushioning medium and together with the vane, partitions and casing, serves to slow down the swinging action of the arm 29. Thus any sharp or abrupt turning of the wheel 6 by the pilot operates only to set or adjust the auxiliary tabs 5 and does not shift or dislodge the arm 29 of the pendulum device from its normal vertical position. The dashpot 40 not only prevents the pendulum from being shifted during any sharp or abrupt turning of the wheel 6 by the pilot but also prevents the pendulum from being affected during sudden airplane acceleration such for example as those resulting from head-on gusts.

The operation of the improved elevator controlling apparatus is as follows: When during flight it is necessary to trim the airplane A the pilot turns the hand wheel 6 until the proper adjustment of the auxiliary tabs 5 is effected. In the event that the airplane pitches downwardly into an abnormal flying condition the arm 29 of the pendulum device 8 swings forwardly and this, as previously pointed out, causes the rear end of the tab raising cable 13 to be paid out and the rear end of the tab lowering cable 14 to be drawn in and results in the tabs 5 being swung downwardly into a position wherein they tend to cause the airplane to return to its normal position. When the airplane pitches upwardly, as for example occurs when the wings encounter an upwardly flowing stream of air, the arm 29 of the pendulum device 8 is caused to swing rearwardly with respect to the fuselage of the airplane and this swinging action through the medium of the sheaves on the stub shafts 38 and 39 on the arm causes the rear end of the tab raising cable 13 to be taken up or tightened and the rear end of the tab lowering cable 14 to be paid out or loosened in such a manner that the tabs are swung upwardly into a position wherein they tend through control of the elevators to return the airplane to its normal flying position. During operation of the airplane the pendulum device 8 operates independently of the hand wheel 6 in the pilot's compartment $a^5$ and serves automatically to stabilize the airplane. Due to the fact that the oil filled casing 42 and the vane 41 on the arm supporting shaft 32 serve as a dashpot for the arm 29 there is no likelihood of the arm being shifted from its normal vertical position with respect to the earth in the event that the hand wheel 6 is abruptly or sharply turned by the pilot or the airplane is subjected to sudden acceleration from gusts.

The herein described elevator controlling apparatus is exceedingly efficient in operation and may be manufactured at a low and reasonable cost. In addition it is exceptionally light in weight due to the fact that the force that is required to move the auxiliary tabs 5 relatively to the elevators is comparatively small and hence the pendulum device 8 need not be bulky. By reason of the fact that the control apparatus includes the pendulum device 8 the airplane with which the apparatus is associated is stable in flight and it is not necessary when the plane is disturbed from its normal flight path for the pilot himself to bring the plane into its normal flying attitude.

In most designs or constructions of airplanes if the load is disposed so that the center of gravity moves either forward or behind certain predetermined points, the plane becomes unstable and will not return of its own accord to its normal flying position. With the elevator controlling apparatus which forms the subject matter of the present invention the airplane regardless of the load distribution within reasonable limits and the position or location of the center of gravity is stable at all times and will return without aid or help from the pilot to its normal flying position.

The invention is not to be understood as restricted to the details set forth, since these may be modified within the scope of the appended claims, without departing from the spirit and scope of the invention.

Having thus described the invention, what I claim as new and desire to secure by Letters Patent is:

1. The combination with an airplane having a pilot's compartment and an elevator, of an auxiliary tab connected to the elevator so that it is movable into different angular positions relatively thereto, means for setting the position of the tab with respect to the elevator so as to control the latter for airplane trimming purposes, comprising tab raising and lowering cables connected at one end thereof to the tab and a cable actuating element disposed in the pilot's compartment and connected to the cables at the other end thereof, and a vertically extending arm positioned adjacent the mid-portion of the cables and having the upper end thereof pivoted so that it is free to swing lengthwise of the airplane, said arm being weighted at its lower end so that it maintains its vertical position in response to the action of gravity, and having a plurality of sheaves at its upper end, said sheaves being so arranged and the mid-portions of the cables being so wrapped around the sheaves that when the airplane during flight tilts from its normal flying position and the arm as a result swings relatively to the airplane the portions of the cables between the arm and the tab are moved independently of the portions between the arm and the actuating element and shift the tab into a position wherein the elevator is controlled so that it tends to return the airplane to its normal flying position.

2. An automatic stabilizer for an airplane comprising in combination, a hinged control surface for the airplane, a vertically extending arm pivoted at a point beneath the extreme upper end thereof and having the lower end thereof weighted so that it maintains a vertical position in response to the action of gravity, a pair of side by side, freely rotatable sheaves on the upper end of the arm above the pivot, a pair of side by side, freely rotatable sheaves on the upper end of the arm at a point beneath the pivot, and a pair of cables for controlling the surface, one of the cables being connected at one end thereof to one side of the surface and extending from the surface to one of the sheaves of the first mentioned pair and thence around said one sheave and downwardly and around one of the sheaves of the second mentioned pair, and having its other end anchored, and the other cable having one of its ends connected to the other side of the surface and extending from the surface to the other sheave of said second mentioned pair and then around said last mentioned sheave and upwardly and around the other sheave of said first mentioned pair and having its other end anchored.

3. The combination with an airplane having a pilot's compartment and an elevator, of an auxiliary tab connected to the elevator so that it is movable into different angular positions relatively thereto, means for setting the position of the tab with respect to the elevator so as to control the latter for airplane trimming purposes, comprising tab raising and lowering cables connected at one end thereof to the tab and a cable actuating element disposed in the pilot's compartment and connected to the cables at the other end thereof, a vertically extending arm positioned adjacent the mid-portion of the cables and having the upper end thereof pivoted so that it is free to swing lengthwise of the airplane, said arm being weighted at its lower end so that it maintains its vertical position in response to the action of gravity, and having a plurality of sheaves at its upper end, said sheaves being so arranged and the mid-portions of the cables being so wrapped around the sheaves that when the airplane during flight tilts from its normal flying position and the arm as a result swings relatively to the airplane the portions of the cables between the arm and the tab are moved independently of the portions between the arm and the actuating element and shift the tab into a position wherein the elevator is controlled so that it tends to return the airplane to its normal flying position, and means for damping swinging of the arm with respect to the airplane so as to prevent displacement of the arm from its normal position when the cable actuating element is abruptly manipulated for airplane trimming purposes.

ROBERT W. AYER.